United States Patent [19]
Peyrot

[11] 3,754,114
[45] Aug. 21, 1973

[54] ROTATABLE WELDING GUN
[76] Inventor: Jean-Pierre Peyrot, 1, avenue de la Division du General Leclerc, Villejuif, France
[22] Filed: Jan. 28, 1972
[21] Appl. No.: 221,497

[30] Foreign Application Priority Data
Apr. 14, 1971 France .............................. 7113182

[52] U.S. Cl. .......................... 219/125 R, 219/60 A
[51] Int. Cl. .............................................. B23k 9/12
[58] Field of Search .................... 219/125 R, 60 A, 219/60 R, 61, 158–161

[56] References Cited
UNITED STATES PATENTS
3,345,494 10/1967 Apblett, Jr. et al. .......... 219/60 A X
2,777,937 1/1957 Bryant .............................. 219/125 R
3,268,706 8/1966 Laming et al. ............... 219/125 R X
3,134,894 5/1964 Farnsworth ...................... 219/125 R
3,125,670 3/1964 Hawthorne ...................... 219/120 R
3,194,937 7/1965 Brons et al. ........................ 219/60 A Primary Examiner—J. V. Truhe
Assistant Examiner—L. A. Schutzman
Attorney—Karl F. Flocks

[57] ABSTRACT

A rotatable welding gun with an axial expansion means for centering radially a mandrel inside a tube to be welded, a reel for wire of welding metal rigidly fixed to the torch and the mandrel, permitting the weld in front of the torch to be supplied with welding metal during the rotation of the rotatable members.

12 Claims, 5 Drawing Figures

ROTATABLE WELDING GUN

The present invention relates to a rotatable welding gun, and more particularly to a gun for automatic welding with a tungsten electrode and with supply of welding metal under a gaseous protecting flux.

Rotatable welding guns for carrying out automatically autogenous welding are already known in the art, but it is sometimes advantageous to weld a tube on to a head-plate with added welding metal. In consequence, the present invention provides a welding gun which can be used for welding tubes on thick plates irrespective of the geometry chosen by the welder, comprising devices which make it possible to control accurately the flow-rates of the circuits of gas and water and also the passage of the current, as a function of the position of the electrodes during the execution of the weld, and by means of which it is also possible to supply the electrode continuously with wire of a welding metal while the electrode, displaced by the rotatable gun, follows its course opposite the circular weld of a tube on the base-plate.

The protecting gas may flow, according to the prior art and in known manner, into the chamber from which it expels the oxidizing air and thus supplies the controlled atmosphere around the welding zone which is necessary for satisfactory execution of the weld.

However, it has been found that although, when the protecting gas is a gas having a relatively high specific weight such as argon, the welding zone is suitably protected, on the other hand when an extremely light gas is adopted, such as helium for example, the gas has a tendency to accumulate in the upper portions and the protection of the weld leaves something to be desired.

The invention therefore also provides a local circumferential diffusion nozzle directed all round the circular position of the zone to be welded, the device comprising at least one axial channel inside the walls of the chamber, a diffusing ring of sintered metal, a slotted nozzle, the lips of which are inclined radially towards the wall of the head-plate to be welded, on which the gun is supported.

Other characteristic features and advantages will be brought out in the description which follows below, reference being made to the accompanying drawings which show by way of indication but not in any limitative sense, two forms of embodiment of the invention:

Figure 1:
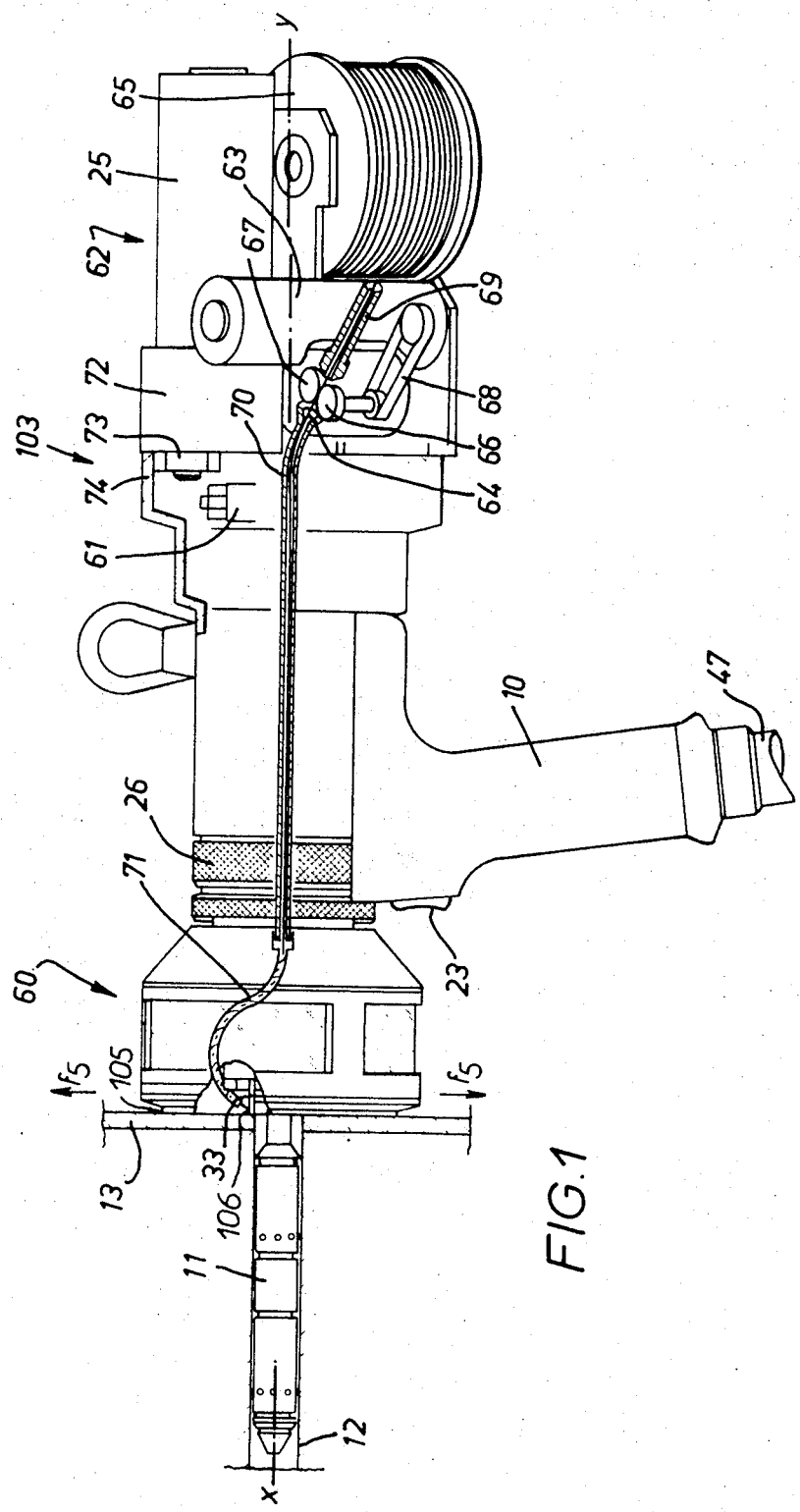
FIG. 1 is a view in elevation, partly in cross-section, of a rotatable welding gun according to the invention.

There can be seen in the drawings a gun 103 rigidly fixed on a mandrel 11 centered in a tube 12 which it is intended to weld by means of an electrode 33 on a base-plate 13. The welding head 60 of the gun is set in rotation when the operator, who holds in his hand the handle 10 secured on the fixed body 26 of the gun, actuates the trigger 23.

The conduit 47 comprises the gas and water conduits and the electrical conductors which supply current to an eight track collector 61 on which eight corresponding brushes mounted on the rear block 62 which rotates with the head 60, supply the necessary power to the four conductors of the motor 25 with a tachometer dynamo, to the two wires of a motor 63 for driving the welding metal wire 64 wound on the reel 65, and to the two conductors of a synchronizing signal transmitter.

It can be seen that the welding metal 64 wound on the reel 65 is driven with an exact control of the length delivered by two rollers 66 and 67, one being a supporting roller and the other a driving roller actuated by a driving motor acting on the wire 63 by means of a transmission belt 68.

The wire 64 is guided in conduits 69 and 70 upstream and downstream of the rollers 66 and 67, and passes through a central conduit (not shown) which re-joins in the head 60 a flexible wire guide 71, the orientation of which can be adjusted as required in order to present the welding metal in a good position on the weld to be re-charged at the level of the base-plate 13 opposite the electrode 33.

It can be seen that the rotatable unit of the rear block 62 of the head 60 and the central sleeve inside which passes the wire 64, rotates at will under the action which is applied by the operator who holds the handle 10, on the contact trigger 23. The contact established by the trigger 23 energizes the motor 25 which acts through the intermediary of a reduction gear 72, on a pinion 73 rigidly fixed to the moving system, this pinion 73 engaging with the fixed toothed wheel 74 on the casing.

Figure 2:
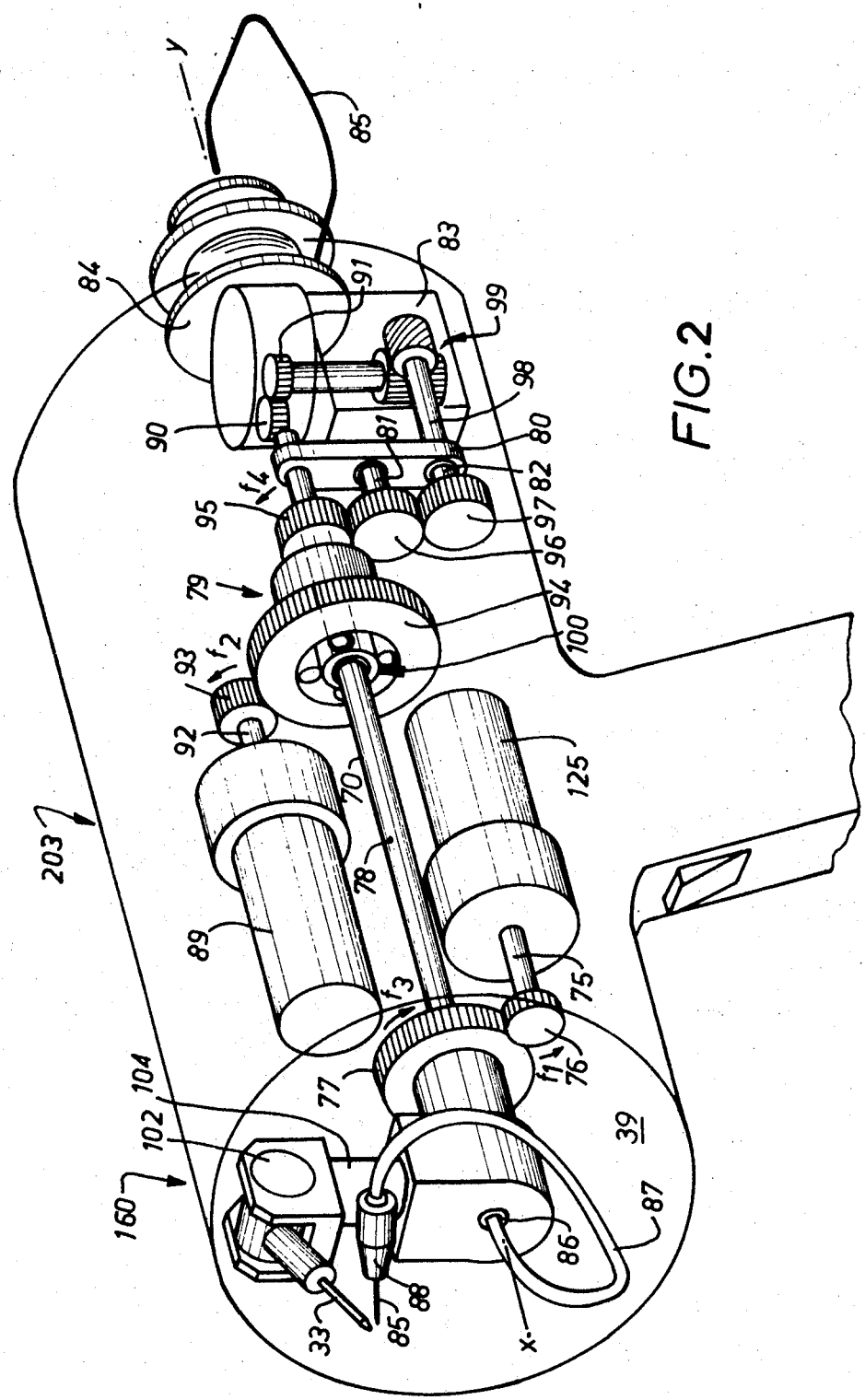
FIG. 2 is a perspective view of an alternative form of construction.

According to an alternative form shown in FIG. 2, a motor 125 driving the torch 33 controls a shaft 75 parallel to the axis $x$–$y$ of the gun 203. A straight pinion 76, keyed on the shaft 75 engages with a reduction gear wheel 77 rigidly fixed to a hollow sleeve or tube 78, on which a system 79 is freely mounted and which is rigidly fixed to a crank handle 80 which drives two short shafts 81 and 82.

The crank handle 80 belongs to a rear unit 83 which carries a reel 84 from which runs the free extremity of the welding metal wire 85 which returns along the axis $x$–$y$ and passes into the interior of the tube 78.

The wire 85 passes out of the front of the gun 203 through an orifice 86 and passes into a sheath 97 which offers it in the welding position inside a guide 88.

There can also be seen a motor 89 for driving the actuating rollers 90 and 91 of the winding reel 83.

The motor 89, rigidly fixed on the body of the gun 203, operates a shaft 92 on which is keyed a straight pinion 93 in engagement with a toothed wheel 94 of the system 79. The wheel 94 is coupled through a unidirectional pawl clutch locking device 100 with a straight pinion 95 which rotates freely on the tube 78. The straight pinion 95, when it is engaged with the toothed wheel 94 can act through the intermediary of a loose pinion 96, to rotate a pinion 97 keyed on a shaft 98, by means of which a 90° bevel gear reference 99 permits the drive of the pinion 91 actuating the rollers of the winding reel 83 between which the wire of welding metal 85 passes.

In operation, the driving motor 89 of the rollers being stopped, the starting-up of the motor 125 in the direction of the arrow $f_1$ fixedly drives the toothed wheel 77, the crank-handle 80 and the reel unit 83 for the wire in rotation about the axis x–y. The pinions 96 and 97 are freely driven in this turning movement without them having any movement of rotation about their axes 81 and 82 and no longitudinal displacement or any torsion force are applied on the wire 85.

The electrode 33 can thus be brought at will into a good working position, the telescopic mounting 104, and the pivot 102 providing a fine adjustment.

If then the motor 89 is started-up which drives the toothed wheel 94 of the system 79 being able to rotate freely around the tube 78, the pinion 93 rotating in the direction of the arrow $f_2$, the wheel 77 and the wheel 94 are both driven in the direction of the arrow $f_3$.

As soon as the speed of the wheel 94 becomes sufficient to cause the operation of the locking pawl device 100 which couples it to the pinion 95 in the system 79, the pinion 95 introduces a differential action in the direction of the arrow $f_4$ with respect to the crank handle 80.

The free pinion 96 in engagement with the pinion 95 and the pinion 97 then impart a driving movement to the wire 85 by means of the rollers 90 and 91, at the speed required so as to feed the weld opposite the electrode 33 of the torch.

When the gun is centered in operation by its mandrel 11 inside the tube 12 and when the operator forces it axially into contact with the plate 13 on the abutment 14, the gas which fills the chamber 39 at a relatively low pressure with a flow-rate of 3 to 7 litres per second for example, is normally delivered between the leakage contact 105 towards the atmosphere along the headplate 13, especially if a gas as light as helium has been chosen to surround the weld.

Figure 3:
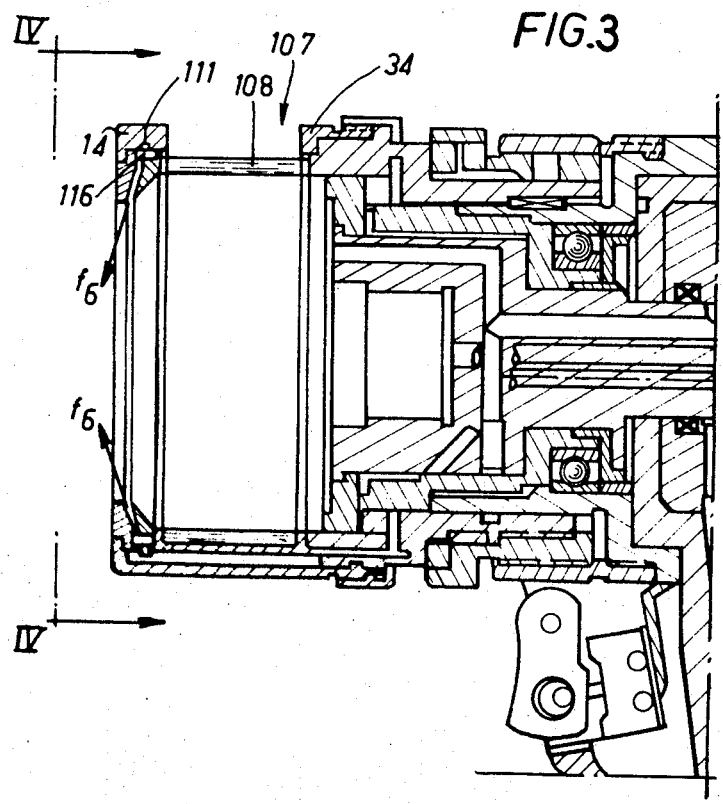
FIG. 3 is a view partly in section with parts broken away of the chamber with a controlled atmosphere according to the invention, which is adapted to the gun shown in FIG. 1.
Figure 5:
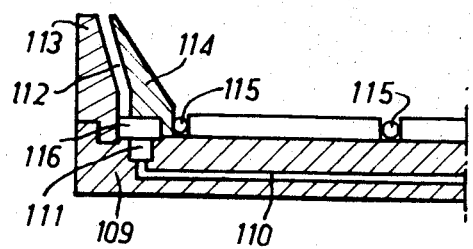
FIG. 5 is a view to a larger scale of a cross-section taken along the line V—V of FIG. 4.
Figure 4:
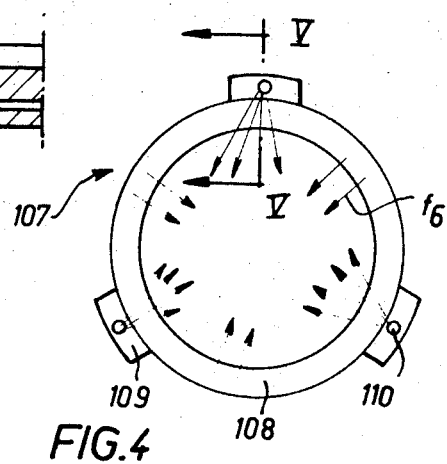
FIG. 4 is an end view taken along the line IV-IV of FIG. 3.

In order to improve the protective effect on the zone 106 at all points, both before and during the passage of the electrode 33 and during the cooling after its passage, the invention provides around the torch 33 between the abutment 14 and the knurled abutment screw 34, a chamber 107 which channels the arrival of the gas in the immediate proximity of the welding zone 106 over a frusto-conical blowing layer inclined in the direction of the arrows $f_6$ (see FIG. 3).

The chamber 107 comprises a transparent wall 108 of quartz held between three metal claws 109 and in fluidtight contact with the axially adjacent parts through the intermediary of toric rings 115.

Each claw 109 is pierced with a channel 110 for leading-in the gas which supplies a collector 111 provided in the abutment ring 14, which is in turn in relation with the flattened slot of a nozzle 112 between the lips 113 and 114 of a peripheral lining which directs the layer of protective gas in the direction of the arrows $f_6$ in the immediate contact of the zone 106.

The porous ring 116 of sintered metal, for example Poral, ensures a uniform diffusion over the whole periphery of the drusto-conical layer, despite the fact that the arrival of the gas is distributed only over three main sectors at the extremities of the three channels 110.

It will of course be understood that the present invention has been described above in the form of a preferred example given by way of indication and not in any limitative sense and that any equivalents may be introduced into its constituent elements without thereby departing from its scope as defined by the appended claims.

I claim:

1. A rotatable welding gun comprising; a fixed body with a handle, a sheath for a fluid inlet and current supply leads extending inside said handle, a rotatable axial mandrel on one end of said fixed body, a torch disposed radially eccentric with respect to said mandrel, means for axially adjusting the position of said torch, adjustable expansion means for radially centering the mandrel inside a tube to be welded, a reel rigidly fixed to said mandrel from which wire welding metal may be unwound and fed up in front of said torch by roller means which carry said wire metal through a sleeve member up to said torch during rotation of rotatable parts which include a central tube rigidly fixed to said torch and to a driving unit for unwinding the wire, a driving motor for the torch on said fixed body and driving motor for the wire metal, said two motors having output pinions that are coupled together by means of an escapement mechanism comprising a uni-directional clutch of the free-wheel type and a transmission with a differential action.

2. A rotatable welding gun as claimed in claim 1 in which the rotatable parts comprise a welding head round a centering mandrel, a rear unit, the central sleeve joining rigidly together the said welding head and the rear unit, the said rear unit carrying a winding reel for wire of welding metal, a roller driving device for the said wire, a motor for setting in rotation the rotatable parts, the said motor driving a pinion which engages internally on a fixed toothed wheel rigidly fixed to the casing of the said gun.

3. A rotatable welding gun as claimed in claim 2, in which the said motor for setting the mobile system into rotation is a tacheometric dynamo motor coupled to a pulse emitter.

4. A rotatable welding gun as claimed in claim 3, in which the said welding wire driving device mounted on the said rear unit carries a driving motor for the wire, a transmission belt, a driving roller and a supporting roller.

5. A rotatable welding gun as claimed in claim 4, in which the casing carries a fixed-collector with eight tracks on which the corresponding brushes of the rear unit of the mobile system collect the power necessary for the four wires of the tacheometer motor, the two wires of the wire driving motor and the two wires of the pulse emitter.

6. A rotatable welding gun as claimed in claim 1, in which the said mechanism comprises a toothed wheel engaging with a first motor and freely mounted around the tube driven by a second motor, and a crank handle rigidly fixed to the said tube, a transmission with a differential driving action on the supply rollers of the wire being mounted eccentrically with respect to the tube on the said crank handle, the said mechanism of the free-wheel clutch device type permitting the introduction into the said transmission of a movement controlled by the said toothed wheel when the angular speed of the said wheel exceeds the angular speed of the said tube.

7. A rotatable welding gun as claimed in claim 6, in which the said crank handle carries three pinions in engagement with each other, the input pinion turning freely on the said tube and the output pinion being connected by the transmission to the welding wire feed rollers, the input pinion being driven in uni-directional rotation with respect to the crank handle by the pawl-clutch device which couples it to the said toothed wheel driven by the first motor when the angular speed of the said wheel becomes greater than that of the tube driven by the second motor.

8. A rotatable welding gun as claimed in claim 1, in which a controlled atmosphere chamber coupled to the body of the gun comprises a cylindrical wall and at least one longitudinal conduit in the interior of the said cylindrical wall coupling an inlet of protective gas coming from the sheath to a circular collector which diffuses the gas over a frusto-conical layer directly on the zone to be welded.

9. A welding gun as claimed in claim 8, in which the said cylindrical wall is of quartz, two toric joints ensuring the fluid-tightness of the chamber at its extremities.

10. A welding gun as claimed in claim 9, in which the said quartz wall is gripped by three claws coupling the body of the gun to an abutment ring, the said ring comprising a collector coupled to the said longitudinal conduits.

11. A welding gun as claimed in claim 10, in which the said collector is coupled to a circular exhaust nozzle by means of a porous filter.

12. A gun as claimed in claim 11, in which the said nozzle is flattened to the form of a slot between two lips which incline the frusto-conical layer of gas towards the internal peripheral region of the said abutment ring, and towards the exterior with respect to the body of the gun so as to flow directly over the zone to be welded.

* * * * *